May 30, 1972  H. OBERWELLAND ET AL  3,666,388
APPARATUS FOR PRODUCING HOLLOW SWEET MEATS
Filed Jan. 28 1970  5 Sheets-Sheet 1
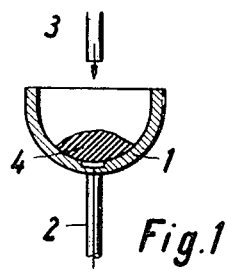
Fig.1
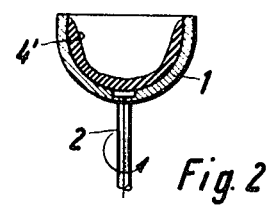
Fig.2
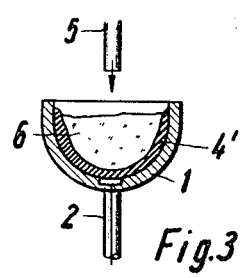
Fig.3
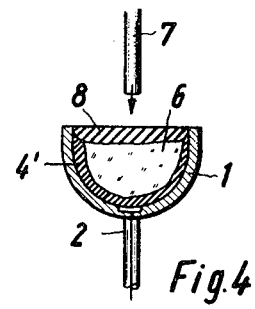
Fig.4
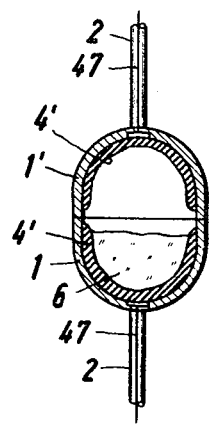
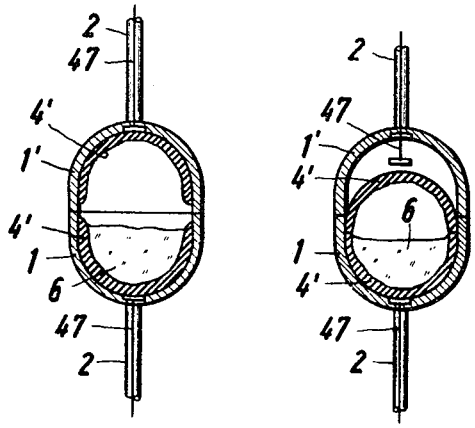
Fig.5  Fig.6
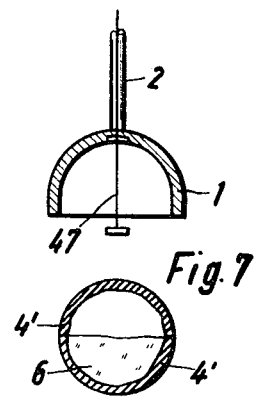
Fig.7
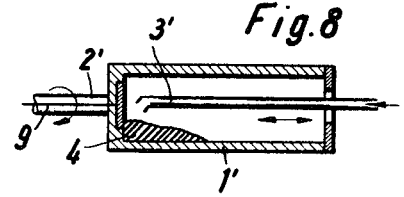
Fig.8
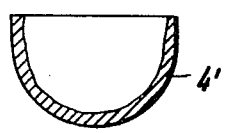
Fig.9
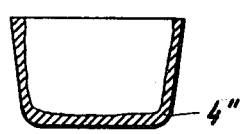
Fig.10
Inventors May 30, 1972 H. OBERWELLAND ETAL 3,666,388
APPARATUS FOR PRODUCING HOLLOW SWEET MEATS
Filed Jan. 28, 1970 5 Sheets-Sheet 2

Inventors
Hugo Oberwelland
Ute Klahn
By
Attorney

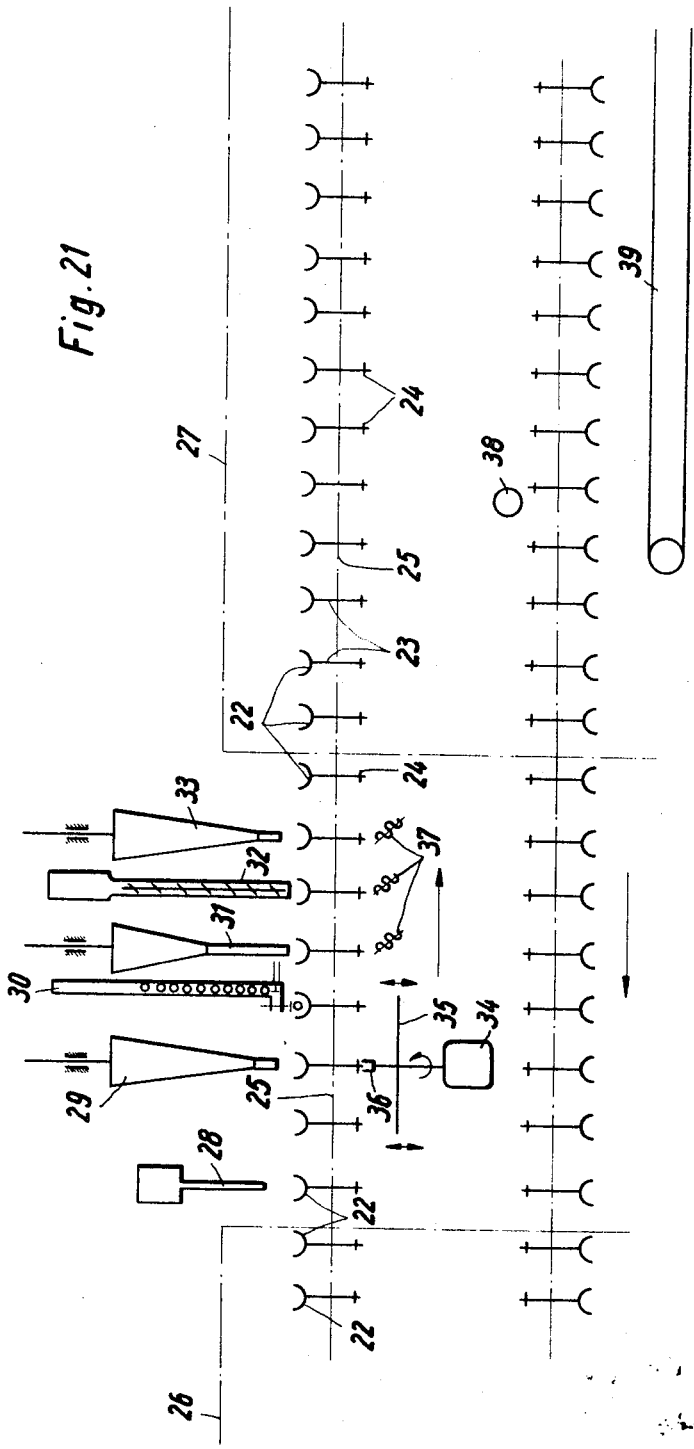

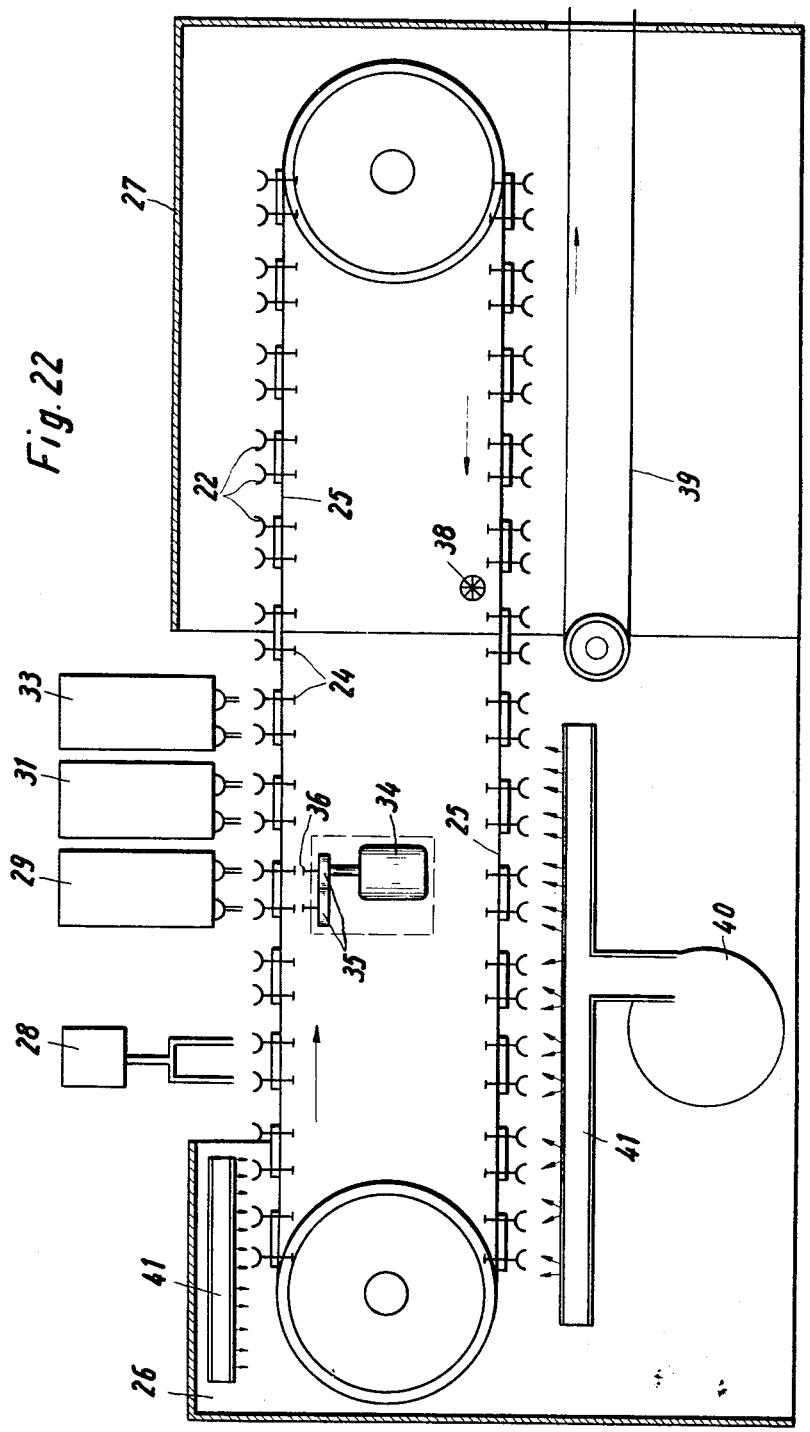

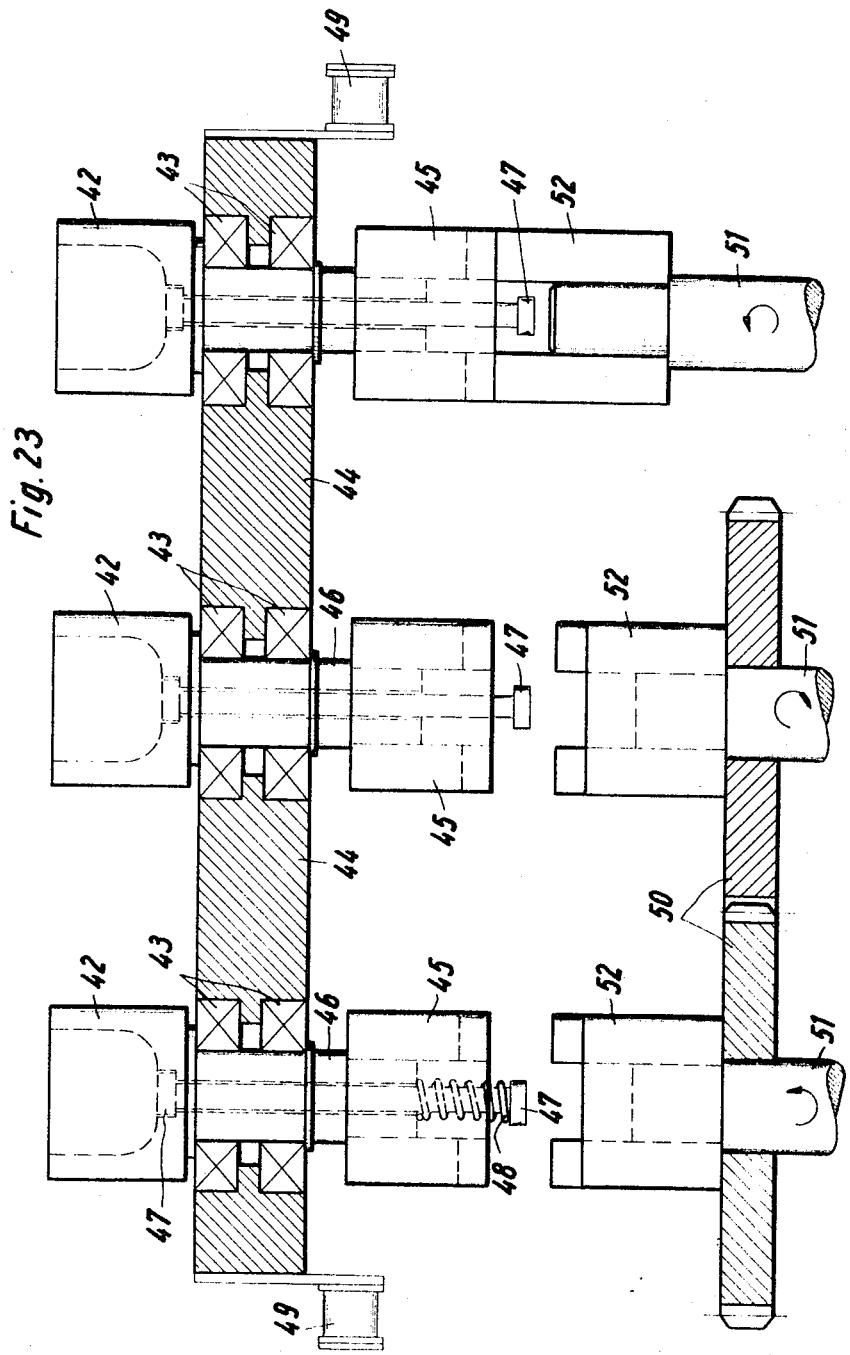

United States Patent Office 3,666,388
Patented May 30, 1972

3,666,388
APPARATUS FOR PRODUCING HOLLOW SWEET MEATS
Hugo Oberwelland and Uwe Klahn, Halle, Germany, assignors to August Storck G.m.b.H., Halle, Germany
Filed Jan. 28, 1970, Ser. No. 6,449
Int. Cl. A23g 3/12, 1/20
U.S. Cl. 425—261
4 Claims

ABSTRACT OF THE DISCLOSURE

A method of and apparatus for producing hollow sweetmeats by spinning an open top mould containing a measured quantity of castable confectionary material or dispensing such a quantity of material into an open top mould from a rotating dispenser so that a hollow body corresponding to the internal shape of the mould is formed by centrifugal force acting on the castable material, cooling the body until it is set, and ejecting the body from the mould.

---

The invention relates to a method and apparatus of producing hollow sweet meats. The method and apparatus of the invention is applicable to sweetmeats made of for example hard blocked or confectioners' sugar, liquorice, fondant cream, jelly, or for example confectioner's cream.

A method according to the invention includes the steps of spinning an open top mould containing a measured quantity of castable confectionary material or dispensing such a quantity of material into an open top mould from a rotating dispenser so that a hollow body corresponding to the internal shape of the mould is formed by centrifugal force acting on the castable material, cooling the body until it is set, and ejecting the body from the mould. The term "spinning" in the context of the present invention relates to the distribution of a quantity of the castable confectionary material on the internal surface of a mould by the effect of centrifugal force engendered by rotating the mould at a sufficiently high speed about its centre axis. The required speed of revolution of the individual mould depends upon the nature and composition, the temperature and viscosity of the mass that is being shaped. In any event it must be sufficiently high (exceeding 200 r.p.m.) to ensure a distribution of the mass over the internal mould walls so that it will rise to the upper edge of the mould as quickly as possible. The method according to the invention can be used with hard boiled sugar and to produce hollow sugar configurations and shapes and thin-walled filled sugar tubes for the economical production of sugar cases. Hollow sugar confections produced by spinning have particularly dense and solid walls so that they possess good keeping and handling qualities, a feature which also applies to sweetmeats filled with readily volatilising substances, such as alcohol, aroma substances and the like.

The hollow sweetmeat contained in the mould after spinning or rotating the dispenser can be provided with a filling and closed with a lid formed from a liquid or viscous hard boiled sugar mass.

The proposed method can be even further developed for forming hollow sweetmeats consisting of several layers by introducing in succession several like or different portions of sugar mass into a rotating centrifugal mould and allowing these to set. Alternatively, sweetmeats can be produced that are provided with a handle. This may be done by renewed spinning after the filling has been inserted to form an upwardly open cavity in the filling and by then filling this cavity partly or wholly with the mass used for forming the lid, the handle being inserted, so that it projects from the sweetmeats into the material forming the lid before this sets.

The open topped moulds may be presented in continuous progression or in intermittent steps to a dispensing device which gives out measured quantities of liquid or viscous confectionary material and the moulds rotated about centre axes, during the filling process, at a sufficiently high speed for the metered quantity of sugar mass discharged into each mould to be distributed over the entire interior mould wall, the mould being then conveyed through a solidification or cooling zone and finally emptied. When the quantity of confectionary material for forming the shell has been filled into the mould, the latter may be presented consecutively to one or more additional dispensing devices for liquid, solid or powder filling materials, whereupon a final dispensing device forms the lid on the filled confection by dispensing a further portion of sugar mass before the sweetmeat passes through the cooling zone and is finally ejected from the mould.

According to whether the moulds are conveyed continuously or in intermittent steps, filling nozzles of the several dispensing devices are arranged either to participate in the forward motion of the moulds that are to be filled or alternatively the intermittently advancing moulds briefly stop under each of the dispensing nozzles.

Two hollow bodies produced by rapid spinning, at least one of which is filled may be placed with their open sides face to face and bonding together. This procedure permits for instance hollow balls of hard boiled sugar containing a liquid or powder filling to be produced.

In order to facilitate ejecting the spun sugar confections from the moulds, the latter may be coated with a parting agent before they are charged with the sugar mass. Alternatively the moulds may to some extent be preheated before they receive the sugar mass to prevent the inflowing mass from being quenched on the internal walls of the mould whilst the mass is still being spun.

The invention includes apparatus for producing hollow sweetmeats comprising a number of open topped moulds, means for introducing a measured quantity of castable confectioners material into said moulds in which either the moulds or the said introducing means are rotatable, so that a hollow body corresponding to the internal shape of the mould is formed by centrifugal force acting on the castable material. The apparatus may include an endless chain for conveying the moulds, a turntable carrying the moulds each being rotatable in a holder, means for rotating the moulds, said means having couplings which can engage the moulds and which are controlled by switches co-operating with said introducing means so that rotation of a mould occurs during or immediately after the introduction of the castable confectionary material into the mould. Preceding the means for dispensing the castable confectionary material a preheating chamber may be provided and following the dispensing device a cooling chamber may be provided, the conveyor passing through both of said chambers. To distribute the filling on and up the sides of the hollow body, the mould may be rotated again. A hot air current maybe used to accelerate the distribution of the mass forming the lid.

Each mould may be provided with an ejecting plunger and, either inside or on the exit side of the cooling chamber, control means for operating the plungers may be located to consecutively eject from their respective moulds the cooled sweetmeats when these have set.

The invention is illustrated by way of example in the accompanying drawings of which:

FIGS. 1 to 8 are schematic representations of individual steps of a method of producing a sweetmeat according to the invention;

FIGS. 9 to 20 show different kinds of sugar confections that can be produced by a method according to the invention;

FIGS. 21 and 22 are diagrammatic representations of apparatus according to the invention for producing sweetmeats; and FIG. 23 illustrates part of the means for conveying moulds and of the drive means for rotating the moulds of an apparatus according to the invention.

Figure 11:
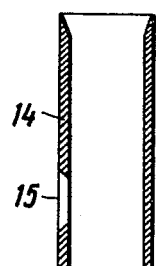

With reference to FIGS. 1 to 7 a cup-shaped mould 1 is fixed to a rotatable shaft 2. The mould 1 is heated to a temperature of between 30 and 80° C., preferably by hot air. Its internal surface is briefly sprayed with a parting agent, unless the mould already possesses a non stick internal lining such as polytetrafluoroethylene.

A measured quantity of hard boiled sugar mass 4 is charged into the hollow mould 1 from a dispensing tube or nozzle 3.

During the introduction of the mass the mould 1 may already be rotating about its axis 2, alternatively, the mass may first be introduced while the mould is stationary and the mold then rotated. The mould must rotate quickly enough for the resultant centrifugal force to spread the sugar mass over the entire internal surface of the mould. A speed of 200 r.p.m. has been found convenient.

The exact speed of mould rotation depends on the viscosity and other physical properties of the sugar mass. During spinning of the mould be liquid or viscous sugar mass 4 is consolidated and solidifies while spreading over the internal walls to form a shell 4', as shown in FIG. 2. During this spinning process the sugar mass is cooled sufficiently to solidify, or at least to retain the shape that has been imparted to it by the spinning motion. The cooling may be assisted by the provision of supplementary blowing nozzle or cooling means. The mould 1, as shown in FIG. 3, can than be moved under another dispensing nozzle 5 which discharges a predetermined quantity of a filling mass 6. This mass may be a liquid or a powder. A solid mixture of liquids and solids may also be introduced or fillings of confectioner's cream or croquant.

Finally the mould which has thus been filled is moved under another filling nozzle 7, FIG. 4, which is likewise fed by metering means which dispenses a quantity of hard boiled sugar mass 8 sufficient to form a lid on the boiled sugar shell 4'. It is important that both the mould and the dispensed sugar mass should be at a temperature that will ensure the formation of an intimate bond between the boiled sugar shell 4' and the lid 8. If necessary the mould 1 may again be spun, while the mass for forming the lid is being dispensed, to promote a rapid distribution of the lid-forming mass. Alternatively, blowing nozzles may be provided which discharge a stream of warm air on the mass forming the lid and thus assist in its even distribution.

The mould may now be conveyed through a cooling zone in which the filled confection completely cools and sets. Unfilled shells without a lid can be produced which are subsequently subjected to some further working processes. Having passed through the cooling zone the finished confection is ejected from the mould.

FIGS. 5 to 7 illustrate a modification of the method described with reference to FIGS. 1 to 4 which substantially consists of making use of two shells 1 and 1' for forming a hollow ball or other shape having the form of a body of revolution. First two moulds 1 and 1' are charged with hard boiled sugar mass as had been described and both moulds are spun to form two sugar shells 4'. After the possible introduction of a filling 6 into one of the shells, for example, the lower shell, the open sides of the two molds 1 and 1' are fitted together and the sugar shell 4' in the upper mould is pushed down by a plunger 47 against the top of the filled shell 4' in the bottom mould as shown in FIG. 6. The temperature must be controlled to ensure that the shells are still in a condition in which their edges will firmly stick and bond together. Having passed through a cooling zone the ball consisting of the two shells 4' is ejected from the mould 1 as shown in FIG. 7.

Whereas the example shown in FIGS. 1 to 6 the mould is rotated about a vertical axis to spin a mass introduced in the axial direction, FIG. 8 schematically illustrates an arrangement in which a substantially cylindrical mould 1" rotates about a horizontal axis 2' on a rotatable shaft 9. In this case the hard boiled sugar mass is introduced through a horizontal tube 3' which extends to the far end of the hollow mould 1". A predetermined quantity of liquid or viscous hard boiled sugar mass 4" is injected into the interior of the mould while the latter rotates, and at the same time the filling tube 3' is grandually retracted from the mould 1". A tubular hollow boiler sugar case is thus formed which may be provided with a filling or used in some other process in a similar manner to that described with reference to FIGS. 1 to 4.

FIGS. 9 to 20 illustrate various forms of confection that have been produced by the above described methods. FIGS. 9 and 10 show respectively a hemispherical hollow case $4^2$ and a cup-shaped shell $4^3$ produced, as described, from a hard boiled sugar mass. Those sugar parts can be further processed or left as they are in the form of sugar cases.

FIG. 11 shows a cast confection in the form of a hollow tube 14 provided with a lateral opening 15 which is known as a "flute."

Figure 12:
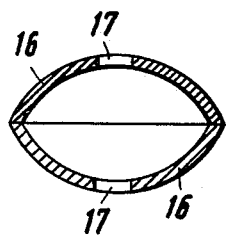

FIG. 12 shows a "whistle sweet." This consists of two hollow shells 16 each provided with an opening 17 in the center and joined together edge-to-edge to form a hollow body prior to setting.

Figure 13:
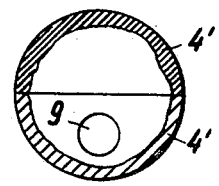

A similar hollow body of spherical shape is shown in FIG. 13. In this confection two half shells $4^4$ have been likewise combined edge-to-edge after the insertion thereinto of a solid body 9, for example a nut.

Figure 14:
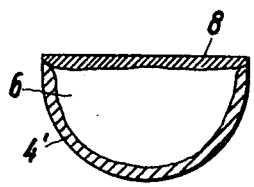
Figure 15:
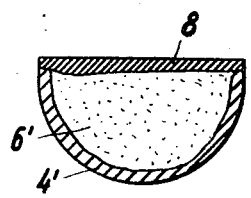

FIGS. 14 and 15 show filled sugar confections consisting of hollow shells as in FIG. 9 which have been filled with a liquid mass 6 (FIG. 14) and a powder mass 6' (FIG. 15) and then closed with a cast lid 8.

The confection shown in FIG. 16 comprises a substantially cylindrical cup $4^4$ filled with a confiture or with confectioner's cream 6" and closed as described with reference to FIG. 4 by casting on a lid 8.

Figure 16:
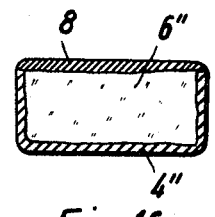
Figure 17:
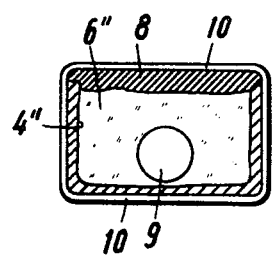

A confection which is principle is the same as that shown in FIG. 16 from which it differs by additional insertion of a solid body 9, such as a nut, and which has been finally provided with an outer coating 10 is shown in FIG. 17.

Figure 18:
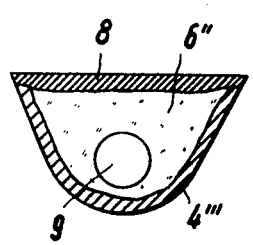

FIG. 18 shows a similar confection to that of FIG. 17 which comprises a hollow shell $4^5$ which is hat- or dome-shaped.

Figure 19:
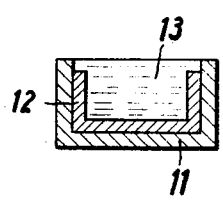

The confection shown in FIG. 19 comprises two interposed shells 11 and 12 containing a filling 13 which also forms the lid.

Figure 20:
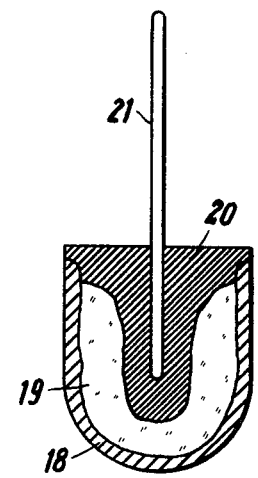

FIG. 20 shows a lollipop produced by a method according to the invention. A hollow shell 18 has been formed by spinning a hard boiled sugar mass within a mould. The shell 18 has been partly filled with a filling 19. By spinning the filling 19, part of the latter has been forced up the inside of the sugar shell 18 to form a central depression which has then been filled with a further sugar mass 20 to form a covering lid. Before this latter mass sets, a stick 21 was inserted into the same. The stick becomes firmly fixed in the solidified sugar mass 20.

The confections shown in FIGS. 9 to 20 can also be produced from other materials used in confectionary, such as liquorice, fondant, jelly, confectioner's cream or chocolate.

The sugar confections described may subsequently be provided with a coating of, for example, chocolate.

FIGS. 21 and 22 schematically illustrate two forms of apparatus for performing a method according to the invention.

With reference to FIG. 21, a plurality of spinning moulds 22 are mounted in mould conveying means not shown in detail but which have the form of for example an endless chain or turn-table. Each mould 22 is affixed at an end of a shaft 23 which is rotatable in a holder attached to the conveyor chain. The other end of the shaft carries a coupling member 24. The upper strand of the chain 25 carrying the moulds 22, 23 travels from left to right in FIG. 21, passing through a heating chamber 26 and cooling means indicated by the outline 27. Between the two units 26 and 27 a variety of dispensing nozzles, feeding and metering devices 28, 29, 30, 31, 32 and 33 are provided. Located underneath this arrangement is a variable speed drive 34 for imparting rotation to the moulds 22 on the travelling chain 25 above. The drive comprises a switch-controlled transmission 35 which is adapted, when raised, by means of a coupling element 36 to engage the coupling 24 on the shaft 23 of a mould 22 and thus to rotate the mould 22. Behind the drive means 34 to 36 vibrators 37 may be provided which operate to accelerate and improve the distribution of the mass contained inside the moulds.

28 is a sprayer for a parting oil, 29 is the dispensing nozzle of a boiled sugar coating machine for forming the sugar shell. 30 is a device for inserting solid bodies such as nuts, raisins, cherries into the shell. 31 is a casting machine for liquid or semi-liquid filling masses, 32 is a metering device for powder fillings and 33 is a sugar casting machine for forming lids. According to the type of confection to be produced, any one or more of these devices can be activated or taken out or operation.

In the cooling zone 27 the confections solidify and set. The molds are carried downwards and return on the bottom strand of the chain, travelling from right to left. During their return they pass an ejecting device 38 which operates ejectors provided in the moulds to eject the finished confections onto a travelling converyor belt 39. Upon entering the heating section 26 the moulds are reheated prior to starting another operating cycle.

The arrangement shown in FIG. 22 is similar in principle to that in FIG. 21, a plurality of molds being mounted in each link of a chain and the dispensing devices being equipped with as many dispensing nozzles as there are molds in each link. For preheating the molds a hot air fan 40 is provided which blows hot air on the molds through a bank of nozzles 41.

FIG. 23 illustrates an apparatus according to the invention in which a number of single molds 42 are rotatably mounted in ball bearings 43 in a common holder 44. The bottom ends of the shafts 46 supporting the molds carry coupling elements 45. Each shaft 46 has an ejecting plunger 47 which is movable axially within the shaft against the biasing force of a spring 48. The mold holders 44 are attached sequentially to a roller chain 49, and rotation can be imparted to the molds via spur wheels 50 mounted on axles 51 which at their ends carry coupling elements 52, and which can be raised and lowered to rotate a mold 42 for a given period of time.

In the illustrated embodiments of apparatus it is assumed that only the molds themselves are to be rotated. However, it would also be possible additionally or exclusively to rotate the filling nozzles at a sufficiently high speed to project the sugar mass centrifugally against the mold walls, so that the mass can solidify and form a hollow shell. Also filling nozzles may be used, particularly for the provision of the lid-forming sugar mass, which contain several orifices to provide a better and more rapid distribution of the mass on the surface.

We claim:
1. An apparatus for producing hollow sweet meats comprising
a plurality of open topped moulds,
means for introducing a measured quantity of castable confectionary material into said moulds,
said plurality of moulds and said introducing means constituting cooperating members, and
one of said cooperating members being rotatable so that a hollow body corresponding to the internal shape of the mould is formed by centrifugal force acting on the castable material,
an endless chain means for conveying said moulds,
a holder rotatably holding a mould and attached to said endless chain means,
means for rotating said moulds, said means including couplings which releasably engage said moulds,
switches controlling said couplings and cooperating with said introducing means so that rotation of a mould occurs at the latest immediately after the introduction of said castable confectionary material into said mould.

2. An apparatus for producing hollow sweet meats comprising
a plurality of open topped moulds,
means for introducing a measured quantity of castable confectionary material into said moulds,
said plurality of moulds and said introducing means consitituing cooperating members, and
one of said cooperating members being rotatable so that a hollow body corresponding to the internal shape of the mould is formed by centrifugal force acting on the castable material,
a turn-table means for conveying said moulds,
a holder rotatably holding said moulds and attached to said turn-table means,
means for rotating said moulds, said means including couplings which releasably engage said moulds,
switches controlling said couplings and cooperating with said introducing means so that rotation of a said mould occurs at the latest immediately after introduction of the castable confectionary material into said moulds.

3. The apparatus, as set forth in claim 1, further comprising
a cooling zone,
said endless chain means carrying said moulds into said cooling zone after said moulds have been rotated and the castable confectionary material introduced into said moulds.

4. The apparatus, as set forth in claim 1, further comprising
an ejector and means for operating said ejector so that the contents of said moulds are removed from the moulds after setting.

References Cited
UNITED STATES PATENTS

| | | | |
|---|---|---|---|
| 1,417,446 | 5/1922 | Brigham | 107—1 A |
| 1,492,738 | 5/1924 | Muller | 107—8 E |
| 1,782,813 | 11/1930 | Ferriera | 107—19 C |
| 1,869,232 | 7/1932 | Weiland | 107—8 C |
| 2,163,580 | 6/1939 | Bianchi | 107—1 A |
| 3,381,631 | 5/1968 | Hornlein et al. | 107—8 C |

FOREIGN PATENTS

| | | | |
|---|---|---|---|
| 930,216 | 7/1963 | Great Britain | 107—8 C |

PRICE C. FAW, JR., Primary Examiner

U.S. Cl. X.R.

425—434, 453